(12) United States Patent
Barbosa et al.

(10) Patent No.: US 7,817,451 B2
(45) Date of Patent: Oct. 19, 2010

(54) SWITCH GEAR CELL AND CONVERTER CIRCUIT FOR SWITCHING A MULTIPLICITY OF VOLTAGE LEVELS WITH A SWITCHGEAR CELL SUCH AS THIS

(75) Inventors: Peter Barbosa, Taoyuan County (TW); Peter Steimer, Ehrendingen (CH); Toufann Chaudhuri, Nyon (CH)

(73) Assignee: ABB Research Ltd, Zurich (CH)

( * ) Notice: Subject to any disclaimer, the term of this patent is extended or adjusted under 35 U.S.C. 154(b) by 341 days.

(21) Appl. No.: 12/058,258

(22) Filed: Mar. 28, 2008

(65) Prior Publication Data

US 2008/0238214 A1    Oct. 2, 2008

(30) Foreign Application Priority Data

Mar. 30, 2007    (EP) .................................. 07105313

(51) Int. Cl.
*H02M 3/18*    (2006.01)
*H02M 7/497*    (2006.01)
(52) U.S. Cl. .............................. 363/60; 363/43; 363/71; 363/131
(58) Field of Classification Search .................... 363/43, 363/60, 71, 131, 124
See application file for complete search history.

(56) References Cited

U.S. PATENT DOCUMENTS 5,461,557 A * 10/1995 Tamagawa .................... 363/60

(Continued)

FOREIGN PATENT DOCUMENTS

DE    692 05 413 T2    6/1996

OTHER PUBLICATIONS

European Search Report dated Sep. 7, 2007 (with English translation of category of cited documents).

(Continued)

*Primary Examiner*—Jeffrey L Sterrett
*Assistant Examiner*—Fred E Finch, III
(74) *Attorney, Agent, or Firm*—Buchanan Ingersoll & Rooney PC

(57) ABSTRACT

A switchgear cell having a group of connection is disclosed, with the group of connection having a first and a second controllable bidirectional power semiconductor switch and a capacitor. In order to reduce the stored electrical energy and to save space, the group of connection can have a third, fourth, fifth and sixth controllable bidirectional power semiconductor switch and the first controllable bidirectional power semiconductor switch can be connected back-to-back in series with the second controllable bidirectional power semiconductor switch, the third controllable bidirectional power semiconductor switch can be connected back-to-back in series with the fourth controllable bidirectional power semiconductor switch, the capacitor can be connected to the connection point of the first controllable bidirectional power semiconductor switch to the second controllable bidirectional power semiconductor switch and to the connection point of the third controllable bidirectional power semiconductor switch) to the fourth controllable bidirectional power semiconductor switch, the fifth controllable bidirectional power semiconductor switch can be connected to the connection point of the first controllable bidirectional power semiconductor switch to the second controllable bidirectional power semiconductor switch, and to the fourth controllable bidirectional power semiconductor switch, and the sixth controllable bidirectional power semiconductor switch can be connected to the connection point of the third controllable bidirectional power semiconductor switch to the fourth controllable bidirectional power semiconductor switch and to the second controllable bidirectional power semiconductor switch.

18 Claims, 6 Drawing Sheets

U.S. PATENT DOCUMENTS

| | | | |
|---|---|---|---|
| 5,737,201 A | 4/1998 | Meynard et al. | |
| 6,480,403 B1 * | 11/2002 | Bijlenga | 363/98 |
| 6,573,695 B2 * | 6/2003 | Shashoua | 323/282 |
| 6,621,719 B2 * | 9/2003 | Steimer et al. | 363/43 |
| 6,879,503 B2 * | 4/2005 | Meynard et al. | 363/71 |
| 6,958,924 B2 * | 10/2005 | Gateau et al. | 363/62 |
| 7,269,037 B2 * | 9/2007 | Marquardt | 363/71 |
| 7,292,460 B2 * | 11/2007 | Barbosa et al. | 363/17 |
| 7,443,698 B2 * | 10/2008 | Steimer et al. | 363/17 |

OTHER PUBLICATIONS

RH Wilkinson et al., "Voltage Unbalance in the Multicell Converter Topology", IEEE Africon, 2002, pp. 759-764 (cited in the attached European Search Report).

Guillaume Gateau et al., "Multicell Converters: Active Control and Observation of Flying-Capacitor Voltages", IEEE Transactions on Industrial Electronics, Oct. 2002, vol. 49, No. 5, pp. 998-1008 (cited in the attached European Search Report.

A. Donzel et al., "New Control Law for Capacitor Voltage Balance in Multilevel Inverter With Switching Rate Control (CVC)", IEEE, 2000, pp. 2037-2044. Laboratoire d'Automatique de Grenoble. BP46, 38402 Saint Martin d'Heres, France (cited in the attached European Search Report).

T. A. Meynard et al., "Modeling of Multilevel Converters", IEEE Transactions on Industrial Electronics, Jun. 1997, vol. 44, No. 3, pp. 356-364 (cited in the attached European Search Report).

* cited by examiner

SWITCH GEAR CELL AND CONVERTER CIRCUIT FOR SWITCHING A MULTIPLICITY OF VOLTAGE LEVELS WITH A SWITCHGEAR CELL SUCH AS THIS

RELATED APPLICATION

This application claims priority under 35 U.S.C. §119 to European Patent Application No. 07105313.6 filed in Europe on Mar. 30, 2007, the entire content of which is hereby incorporated by reference in its entirety.

TECHNICAL FIELD

Converter circuits are disclosed which are, for example, based on a switchgear cell and a converter circuit for switching a multiplicity of voltage levels.

BACKGROUND INFORMATION

Nowadays, converter circuits are used in a wide range of power-electronic applications. A converter circuit such as this should firstly produce as few harmonics as possible on phases of an electrical AC voltage power supply system which is connected to the converter circuit, and on the other hand transmit power levels that are as high as possible with as small a number of electronic components as possible. One suitable converter circuit for switching a multiplicity of switching voltage levels is specified in DE 692 05 413 T2. This document specifies a switchgear cell having a group of connection, with the group of connection having a first and a second controllable bidirectional power semiconductor switch and a capacitor. The first and the second controllable bidirectional power semiconductor switch are each formed by a bipolar transistor with a drive electrode arranged in an insulated manner (IGBT—Insulated Gate Bipolar Transistor) and by a diode connected back-to-back in parallel with the bipolar transistor.

A switchgear cell for the converter circuit for switching a multiplicity of switching voltage levels according to DE 692 05 413 T2 stores electrical energy in the switchgear cell during operation that is very high. Since the electrical energy is stored in the capacitor in the switchgear cell, the capacitor and the power semiconductor switches are designed for this electrical energy, that is to say with regard to the withstand voltage (blocking voltage) and/or the capacitance. However, this involves capacitors with a large physical size, which are correspondingly expensive. Furthermore, the switchgear cell and therefore the converter circuit as well use a large amount of space because of the physically large capacitors, so that a space-saving design, as is desired for many applications, for example for traction applications, is inhibited. Furthermore, expensive and complex power semiconductor switches are used which have a high withstand voltage. In addition, the use of the physically large capacitors can result in a large amount of assembly and maintenance effort. In addition, the converter circuit for switching a multiplicity of switching voltage levels according to DE 692 05 413 T2 can be susceptible to high voltages, in particular to over voltages, because of the exclusive use of bipolar transistors with a control electrode arranged in an insulated manner as the controllable power semiconductor switch, and can also produce considerable power losses.

SUMMARY

Exemplary embodiments disclosed herein are directed to a switchgear cell which stores as little electrical energy as possible during its operation and can be designed in a space-saving manner. Additional exemplary embodiments disclosed herein are directed to a converter circuit for switching a multiplicity of voltage levels, which likewise stores as little electrical energy as possible during its operation and can be produced in a space-saving manner, is very largely insensitive to high voltages and fault states, and has low power losses.

A switchgear cell is disclosed having a group of connections, with the group of connection having a first and a second controllable bidirectional power semiconductor switch and a capacitor, wherein the group of connection has a third, fourth, fifth and sixth controllable bidirectional power semiconductor switch and the first controllable bidirectional power semiconductor switch is connected back-to-back in series with the second controllable bidirectional power semiconductor switch, the third controllable bidirectional power semiconductor switch is connected back-to-back in series with the fourth controllable bidirectional power switch, the capacitor is connected to the connection point of the first controllable bidirectional power semiconductor switch to the second controllable bidirectional power semiconductor switch and to the connection point of the third controllable bidirectional power semiconductor switch to the fourth controllable bidirectional power semiconductor switch, the fifth controllable bidirectional power semiconductor switch is connected to the connection point of the first controllable bidirectional power semiconductor switch to the second controllable bidirectional power semiconductor switch, and to the fourth controllable bidirectional power semiconductor switch, and the sixth controllable bidirectional power semiconductor switch is connected to the connection point of the third controllable bidirectional power semiconductor switch to the fourth controllable bidirectional power semiconductor switch and to the second controllable bidirectional power semiconductor switch, wherein a first capacitive energy store and a second capacitive energy store, which is connected in series with the first capacitive energy store are provided, and wherein the first controllable bidirectional power semiconductor switch and the third controllable bidirectional power semiconductor switch are connected to one another at the connection point of the first capacitive energy store to the second capacitive energy store.

BRIEF DESCRIPTION OF THE DRAWINGS

These and further objects, advantages and features of the present disclosure will become clear from the detailed description of exemplary embodiments of the invention in conjunction with the drawings. In the figures.

The reference symbols used in the drawing and their meanings are listed, in a summarized form, in the list of reference symbols. In principle, identical parts are provided with the same reference symbols in the figures. The described embodiments represent examples of the subject matter of the invention, and have no restrictive effect.

DETAILED DESCRIPTION

Figure 1:
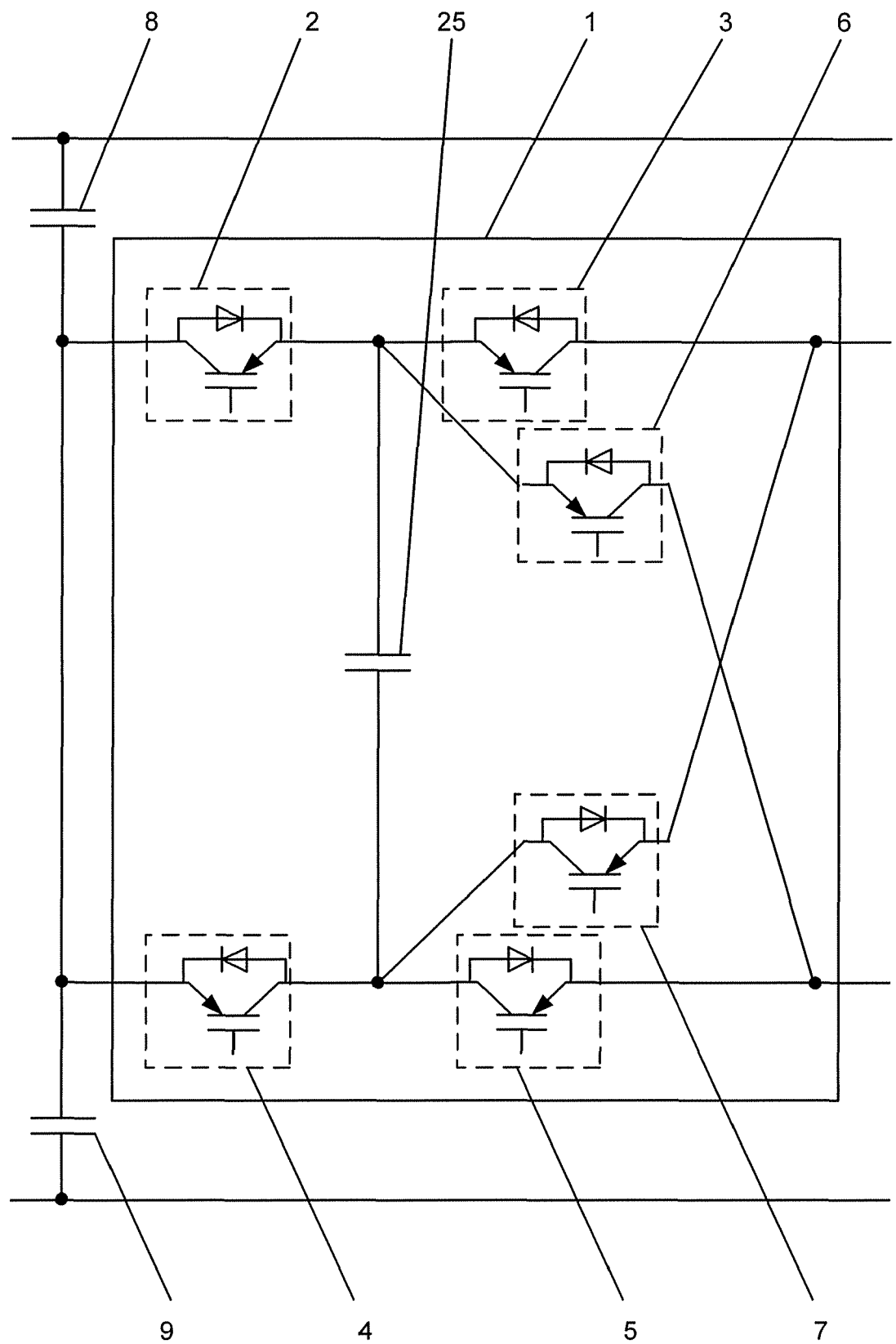
FIG. 1 shows a first exemplary embodiment of switchgear cell according to the disclosure.

The switchgear cell according to the disclosure has a group of connection with the group of connection having a first and a second controllable bidirectional power semiconductor switch and a capacitor. The group of connection furthermore has a third, fourth, fifth and sixth controllable bidirectional power semiconductor switch with the first controllable bidirectional power semiconductor switch being connected back-to-back in series with the second controllable bidirectional power semiconductor switch and the third controllable bidirectional power semiconductor switch being connected back-to-back in series with the fourth controllable bidirectional power switch. The capacitor is furthermore connected to the connection point of the first controllable bidirectional power semiconductor switch to the second controllable bidirectional power semiconductor switch and to the connection point of the third controllable bidirectional power semiconductor switch to the fourth controllable bidirectional power semiconductor switch. The fifth controllable bidirectional power semiconductor switch is additionally connected to the connection point of the first controllable bidirectional power semiconductor switch to the second controllable bidirectional power semiconductor switch, and to the fourth controllable bidirectional power semiconductor switch, the sixth controllable bidirectional power semiconductor switch being connected to the connection point of the third controllable bidirectional power semiconductor switch to the fourth controllable bidirectional power semiconductor switch and to the second controllable bidirectional power semiconductor switch. Furthermore, a first capacitive energy store and a second capacitive energy store, which is connected in series with the first capacitive energy store, are provided, with the first controllable bidirectional power semiconductor switch and the third controllable bidirectional power semiconductor switch being connected to one another at the connection point of the first capacitive energy store to the second capacitive energy store. The amount of electrical energy stored in the switchgear cell can be kept low by means of the controllable bidirectional power semiconductor switches, the capacitor, the two capacitive energy stores and their connections to one another and between one another as described above, in which case the withstand voltage or the blocking voltage of the individual controllable bidirectional power semiconductor switches need correspond only with the voltage of the capacitor, this being the maximum voltage across the capacitor, and in which case the individual controllable bidirectional power semiconductor switches need accordingly be designed only such that their blocking voltage is appropriate for this voltage. Because of the small total amount of electrical energy stored in the switchgear cell, it can be kept small, since the capacitor in the switchgear cell need be designed only for this small amount of electrical energy to be stored, that is to say with regard to its withstand voltage and/or its capacitance. Because of the small physical size of the capacitor resulting from this, the switchgear cell requires very little space. Furthermore, the assembly and maintenance effort can be kept low, because of the small physical size.

An exemplary converter circuit according to the disclosure for switching a multiplicity of voltage levels comprises a switchgear cell as disclosed therein and, in addition, a phase switchgear cell, with the phase switchgear cell having a first, second, third, fourth, fifth and sixth controllable bidirectional power semiconductor switch, and with the first controllable bidirectional power semiconductor switch of the phase switchgear cell being connected in series with the second controllable bidirectional power semiconductor switch in the phase switchgear cell, with the third controllable bidirectional power semiconductor switch in the phase switchgear cell being connected in series with the fourth controllable bidirectional power semiconductor switch in the phase switchgear cell, and with the fifth controllable bidirectional power semiconductor switch in the phase switchgear cell being connected to the connection point of the first controllable bidirectional power semiconductor switch to the second controllable bidirectional power semiconductor switch in the phase switchgear cell. The sixth controllable bidirectional power semiconductor switch in the phase switchgear cell is also connected to the connection point of the third controllable bidirectional power semiconductor switch to the fourth controllable bidirectional power semiconductor switch in the phase switchgear cell. In addition, the first controllable bidirectional power semiconductor switch in the phase switchgear cell is connected to the first capacitive energy store in the switchgear cell, with the second controllable bidirectional power semiconductor switch in the phase switchgear cell being connected to the connection point of the sixth controllable bidirectional power semiconductor switch to the second controllable bidirectional power semiconductor switch in the switchgear cell. The fourth controllable bidirectional power semiconductor switch in the phase switchgear cell is also connected to the second capacitive energy store in the switchgear cell, with the third controllable bidirectional power semiconductor switch in the phase switchgear cell being connected to the connection point of the fifth controllable bidirectional power semiconductor switch to the fourth controllable bidirectional power semiconductor switch in the switchgear cell. The controllable bidirectional power semiconductor switches in the phase switchgear cell and in the switchgear cell according to the disclosure therefore allow the stored electrical energy in the converter circuit produced in this way to be kept low. Because of the small total amount of electrical energy stored in the converter circuit, the converter circuit can be kept small and therefore occupies very little space. The converter circuit is therefore predestined for many applications, for example for traction applications. Furthermore, because of the switchgear cell and the phase switchgear cell, the converter circuit requires fewer components than conventional converter circuits in order to achieve the switching voltage levels. In addition, because of the switchgear cell and the phase switchgear cell, the converter circuit can have a high withstand voltage and can therefore be insensitive to high voltages and fault states and, overall, can have low power losses.

FIG. 1 shows a first exemplary embodiment of a switchgear cell, in which the switchgear cell has a group of connection 1, with the group of connection 1 having a first and a second controllable bidirectional power semiconductor switch 2, 3 and a capacitor 25. The group of connection 1 also has, for example, a third, fourth, fifth and sixth controllable bidirectional power semiconductor switch 4, 5, 6, 7 with the first controllable bidirectional power semiconductor switch 2 being connected back-to-back in series with the second controllable bidirectional power semiconductor switch 3 and with the third controllable bidirectional power semiconductor switch 4 being connected back-to-back in series with the fourth controllable bidirectional power semiconductor switch 5. In addition, the capacitor 25 in the group of connection is connected to the connection point of the first controllable bidirectional power semiconductor switch 2 to the second controllable bidirectional power semiconductor switch 3 and to the connection point of the third controllable bidirectional power semiconductor switch 4 to the fourth controllable bidirectional power semiconductor switch 5. The fifth controllable bidirectional power semiconductor switch 6 is also connected to the connection point of the first controllable bidirectional power semiconductor switch 2 to the second controllable bidirectional power semiconductor switch 3, and to the fourth controllable bidirectional power semiconductor switch 5, with the sixth controllable bidirectional power semiconductor switch 7 being connected to the connection point of the third controllable bidirectional power semiconductor switch 4 to the fourth controllable bidirectional power semiconductor switch 5 and to the second controllable bidirectional power semiconductor switch 3. Furthermore, a first capacitive energy store and a second capacitive energy store, connected in series with the first capacitive energy store 8, 9 are provided, with the first controllable bidirectional power semiconductor switch 2 and the third controllable bidirectional power semiconductor switch 4 being connected to one another at the connection point of the first capacitive energy store 8 to the second capacitive energy store 9. The amount of electrical energy stored in the switchgear cell can be kept low by means of the controllable bidirectional power semiconductor switches 2, 3, 4, 5, 6, 7, the capacitor 25, the two capacitive energy stores 8, 9 and their connections as described above to one another and between one another, with the withstand voltage or the blocking voltage of the individual controllable bidirectional power semiconductor switches 2, 3, 4, 5, 6, 7 having to correspond only to the voltage of the capacitor 25, which is the maximum voltage across the capacitor 25, and with the individual controllable bidirectional power semiconductor switches 2, 3, 4, 5, 6, 7 accordingly having to be designed for this voltage, with regard to their blocking voltage. Owing to the small total amount of electrical energy stored in the switchgear cell, it can be kept small, since the capacitor 25 in the switchgear cell need be designed only for this small amount of electrical energy to be stored, that is to say with respect to its withstand voltage and/or its capacitance. Because of the small physical size of the capacitor 25 with this result, the switchgear cell can use very little space. Furthermore, the small physical size also makes it possible to keep the assembly and maintenance effort low.

Figure 2:
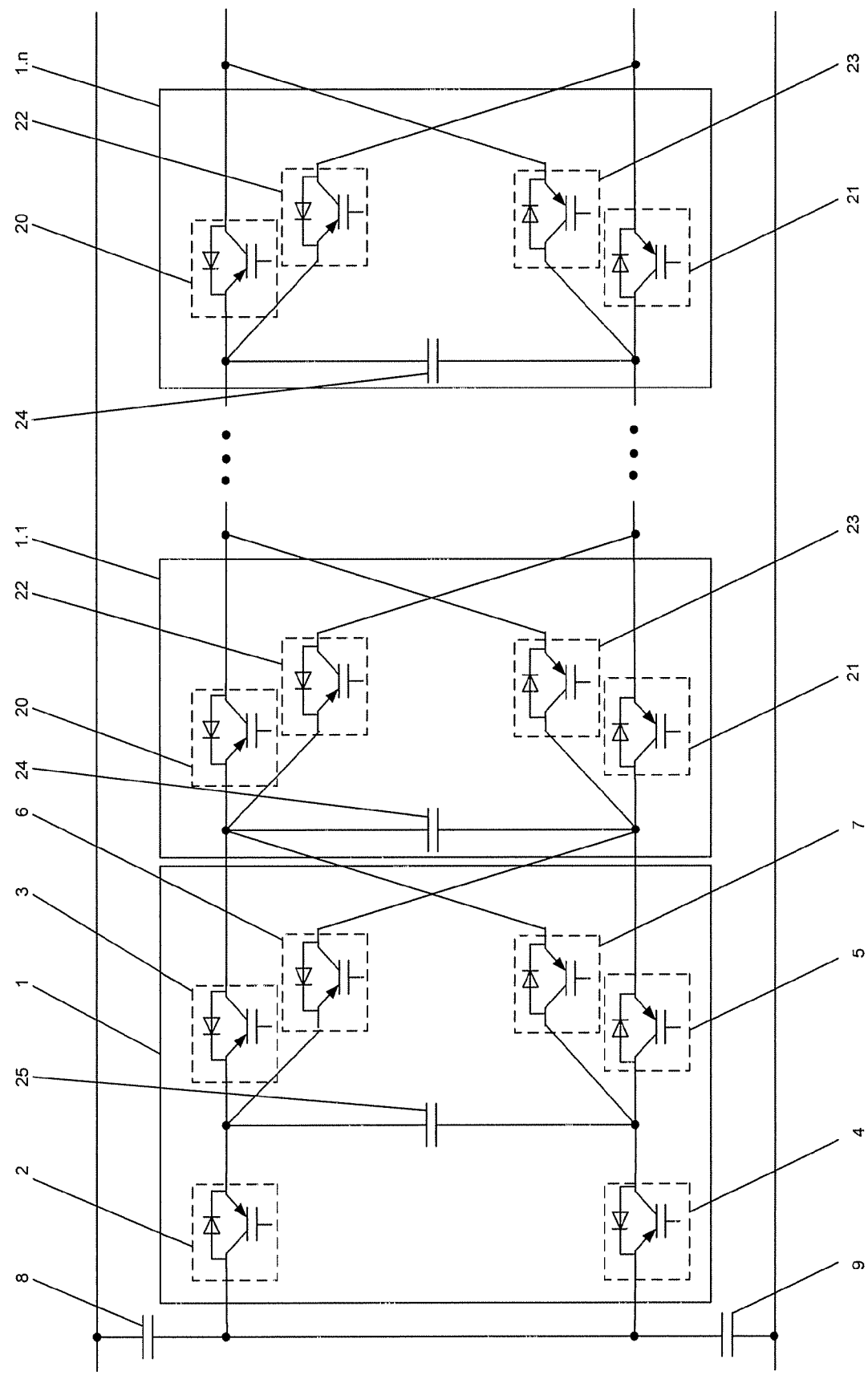
FIG. 2 shows a second exemplary embodiment of the switchgear cell according to the disclosure.

FIG. 2 shows a second exemplary embodiment of the switchgear cell, in which n further groups of connection 1.1, ... 1.n are provided, which each have a first, second, third and fourth controllable bidirectional power semiconductor switch 20, 21, 22, 23 and a capacitor 24, where n≧1. In each of the n further groups of connection 1.1, ... 1.n, the capacitor 24 is connected to the first controllable bidirectional power semiconductor switch 20 and to the second controllable bidirectional power semiconductor switch 21, with the third controllable bidirectional power semiconductor switch 22 being connected to the connection point of the capacitor 24 to the first controllable bidirectional power semiconductor switch 20 and to the second controllable bidirectional power semiconductor switch 21. Furthermore, the fourth controllable bidirectional power semiconductor switch 23 is connected to the connection point of the capacitor 24 to the second controllable bidirectional power semiconductor switch 21 and to the first controllable bidirectional power semiconductor switch 20. Since, as is shown in FIG. 2, each of the n further groups of connection 1.1, . . . 1.n represents a four-pole network, each of the n further groups of connection 1.1, ... 1.n is connected in a linked form to the respectively adjacent further group of connection 1.1, . . . 1.n, with the group of connection 1 being connected to the first further group of connection 1.1. In order to connect the group of connection 1 to the first further group of connection 1.1, the connection point of the sixth controllable bidirectional power semiconductor switch 7 to the second controllable bidirectional power semiconductor switch 3 in the group of connection 1 is connected to the connection point of the capacitor 24 to the first controllable bidirectional power semiconductor switch 20 in the first further group of connection 1.1. Furthermore, the connection point of the fifth controllable bidirectional power semiconductor switch 6 to the fourth controllable bidirectional power semiconductor switch 5 in the group of connection 1 is connected to the connection point of the capacitor 24 to the second controllable bidirectional power semiconductor switch 21 in the first further group of connection 1.1. In addition to the already mentioned advantages of the switchgear cell according to the disclosure, the n further groups of connection 1.1, . . . 1.n allow additional switching voltage levels, that is to say a multiplicity of switching voltage levels, to be achieved, depending on the choice of the number n of further groups of connection 1.1, . . . 1.n without major circuit complexity and with a small number of components.

The first, second, third, fourth, fifth and sixth controllable bidirectional power semiconductor switches 2, 3, 4, 5, 6, 7 in the group of connection 1 can, for example, each have at least two controllable bidirectional switching elements, with the controllable bidirectional switching elements being connected in series. The voltage to be switched on the respective controllable bidirectional power semiconductor switches 2, 3, 4, 5, 6, 7 can therefore be increased. Furthermore, the first, second, third and fourth controllable bidirectional power semiconductor switches 20, 21, 22, 23 in each n further group of connection 1.1, . . . 1.n may also each have at least two controllable bidirectional switching elements, with the controllable bidirectional switching elements then being connected in series. In this case as well, the voltage to be switched on the respective controllable bidirectional power semiconductor switches 20, 21, 22, 23 can be increased. Accordingly, any desired number of controllable bidirectional switching elements may be used for each controllable bidirectional power semiconductor switch 2, 3, 4, 5, 6, 7, 20, 21, 22, 23 in the switchgear cell 1, in the embodiments shown in FIG. 1 and FIG. 2.

Figure 3:
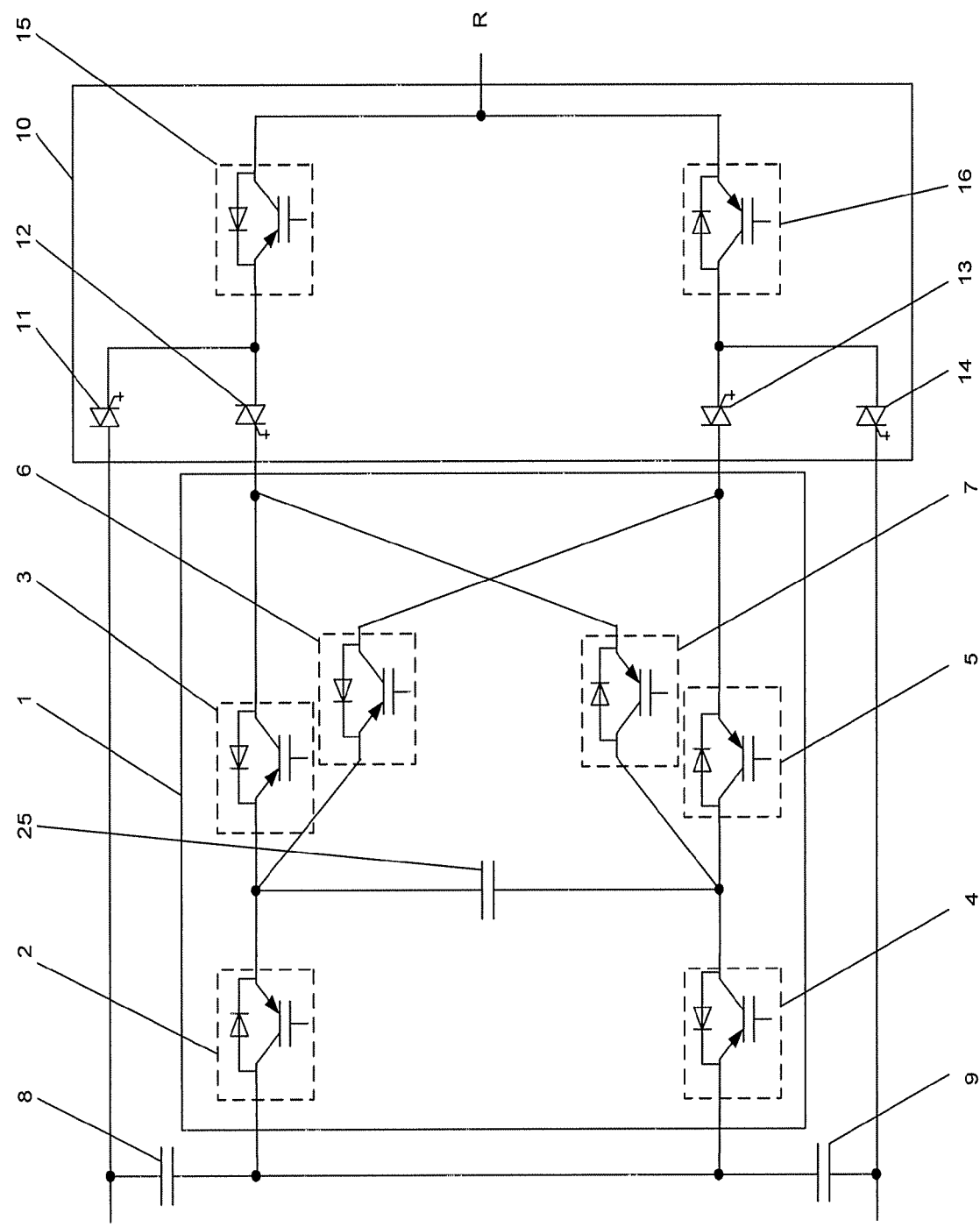
FIG. 3 shows a first exemplary embodiment of a converter circuit according to the disclosure.

FIG. 3 shows a first exemplary embodiment of a converter circuit, which has a switchgear cell 1 as disclosed herein, as shown in FIG. 1. Furthermore, a phase switchgear cell 10 is provided in the converter circuit shown in FIG. 3, with the phase switchgear cell 10 having a first, second, third, fourth, fifth and sixth controllable bidirectional power semiconductor switch 11, 12, 13, 14, 15, 16 and with the first controllable bidirectional power semiconductor switch 11 in the phase switchgear cell 10 being connected in series with the second controllable bidirectional power semiconductor switch 12 in the phase switchgear cell 10, with the third controllable bidirectional power semiconductor switch 13 in the phase switchgear cell 10 being connected in series with the fourth controllable bidirectional power semiconductor switch 14 in the phase switchgear cell 10, and with the fifth controllable bidirectional power semiconductor switch 15 in the phase switchgear cell 10 being connected to the connection point of the first controllable bidirectional power semiconductor switch 11 to the second controllable bidirectional power semiconductor switch 12 in the phase switchgear cell 10. The sixth controllable bidirectional power semiconductor switch 16 in the phase switchgear cell 10 is also connected to the connection point of the third controllable bidirectional power semiconductor switch 13 to the fourth controllable bidirectional power semiconductor switch 14 in the phase switchgear cell 10. Furthermore, the first controllable bidirectional power semiconductor switch 11 in the phase switchgear cell 10 as shown in FIG. 3 is connected to the first capacitive energy store 8 in the switchgear cell 1, with the second controllable bidirectional power semiconductor switch 12 in the phase switchgear cell 10 being connected to the connection point of the sixth controllable bidirectional power semiconductor switch 7 to the second controllable bidirectional power semiconductor switch 3 in the switchgear cell 1. In addition, the fourth controllable bidirectional power semiconductor switch 14 in the phase switchgear cell 10 is connected to the second capacitive energy store 9 in the switchgear cell 1, with the third controllable bidirectional power semiconductor switch 13 in the phase switchgear cell 10 being connected to the connection point of the fifth controllable bidirectional power semiconductor switch 6 to the fourth controllable bidirectional power semiconductor switch 5 in the phase switchgear cell 1. The converter circuit as described above as shown in FIG. 3 allows up to five switching voltage levels, with a very small number of components.

In an alternative exemplary embodiment of the converter circuit as shown in FIG. 3, and as described above, a switchgear cell 1 as disclosed herein, in FIG. 2. Furthermore, a phase switchgear cell 10, is provided in this case, with the phase switchgear cell 10 having a first, second, third, fourth, fifth and sixth controllable bidirectional power semiconductor switch 11, 12, 13, 14, 15, 16 and with the first controllable bidirectional power semiconductor switch 11 in the phase switchgear cell 10 being connected in series with the second controllable bidirectional power semiconductor switch 12 in the phase switchgear cell 10, with the third controllable bidirectional power semiconductor switch 13 in the phase switchgear cell 10 being connected in series with the fourth controllable bidirectional power semiconductor switch 14 in the phase switchgear cell 10, and with the fifth controllable bidirectional power semiconductor switch 15 in the phase switchgear cell 10 being connected to the connection point of the first to the second controllable bidirectional power semiconductor switch 11, 12 in the phase switchgear cell 10. The sixth controllable bidirectional power semiconductor switch 16 in the phase switchgear cell 10 is also connected to the connection point of the third to the fourth controllable bidirectional power semiconductor switch 13, 14 in the phase switchgear cell 10, with the first controllable bidirectional power semiconductor switch 11 in the phase switchgear cell 10 being connected to the first capacitive energy store 8 in the switchgear cell 1, and with the second controllable bidirectional power semiconductor switch 12 in the phase switchgear cell 10 being connected to the connection point of the fourth controllable bidirectional power semiconductor switch 23 to the first controllable bidirectional power semiconductor switch 20 in the n-th further switchgear cell 1.*n*. Furthermore, the fourth controllable bidirectional power semiconductor switch 14 in the phase switchgear cell 10 is connected to the second capacitive energy store 9 in the switchgear cell 1, with the third controllable bidirectional power semiconductor switch 13 in the phase switchgear cell 10 being connected to the connection point of the third controllable bidirectional power semiconductor switch 22 to the second controllable bidirectional power semiconductor switch 21 in the n-th further switchgear cell 1.*n*. A multiplicity of switching voltage levels are accordingly possible by means of the converter circuit as described above, depending in particular on, for example, the number n of further groups of connection 1.1, . . . 1.*n*.

The amount of electrical energy stored in the converter circuit produced in this way can be kept low by means of the controllable bidirectional power semiconductor switches 11, 12, 13, 14, 15, 16 in the phase switchgear cell 10 and the controllable bidirectional power semiconductor switches 2, 3, 4, 5, 6, 7, 20, 21, 22, 23 in the switchgear cell 1 disclosed herein. Because of the small total amount of electrical energy stored in the converter circuit, the converter circuit can therefore be kept small, and thus occupies very little space. The converter circuit is therefore predestined for many applications, for example for traction applications. Furthermore, because of the switchgear cell 1 and the phase switchgear cell 10, the converter circuit can use fewer components than known converter circuits to produce the switching voltage levels. In addition, because of the switchgear cell 1 and the phase switchgear cell 10, the converter circuit can have a high withstand voltage and can therefore be insensitive to high voltages and fault states, and can have low power losses overall.

The fifth and sixth controllable bidirectional power semiconductor switch 15, 16 in the phase switchgear cell 10 can, for example, be connected to one another and accordingly form a phase connection, in particular for the phase R as illustrated by way of example in FIG. 3.

Figure 4:
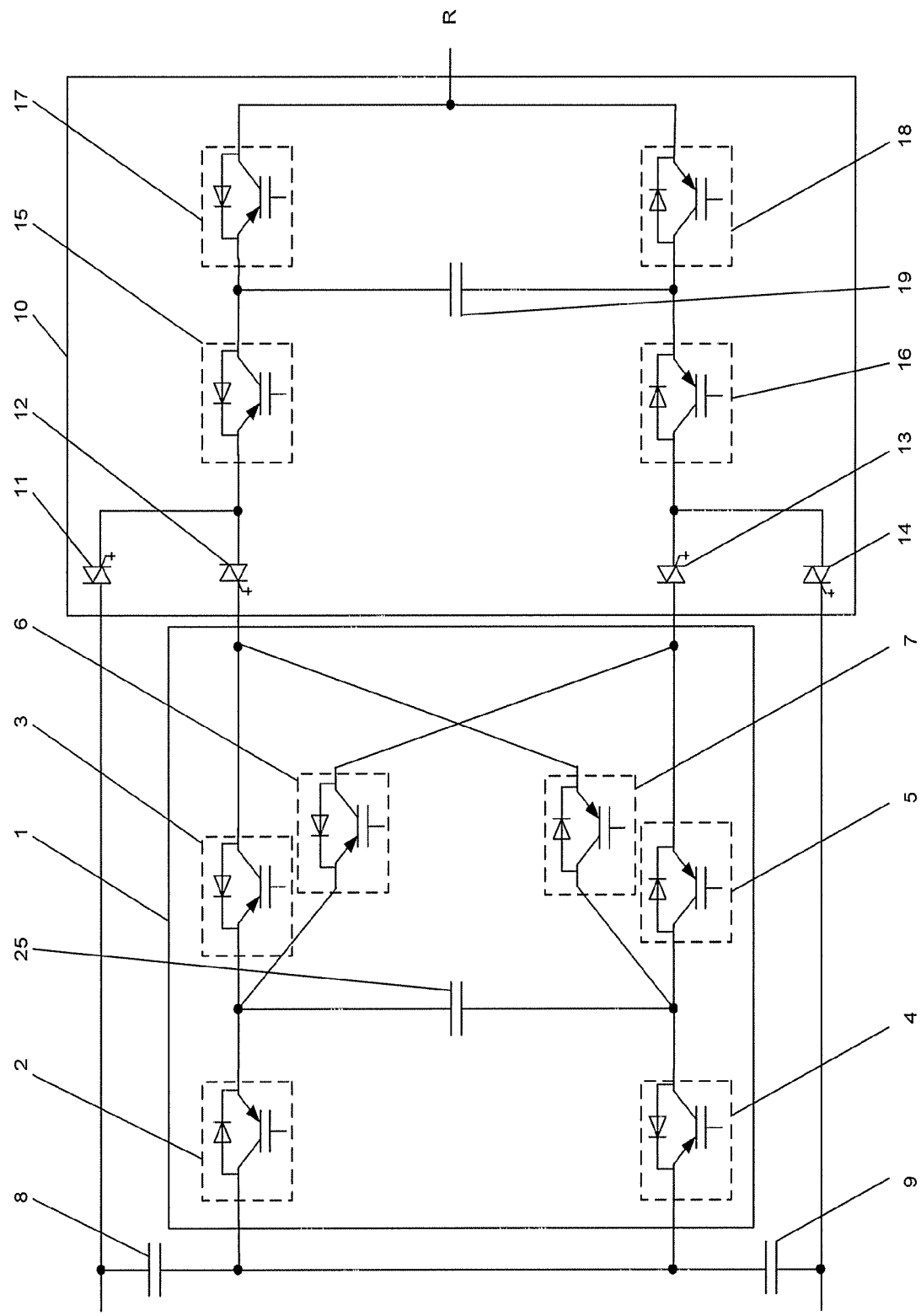
FIG. 4 shows a second exemplary embodiment of the converter circuit according to the disclosure.

In a further development of the converter circuit shown in FIG. 3, or else in conjunction with the alternative variant of the converter circuit which has been described above is not illustrated, FIG. 4 shows a second exemplary embodiment of the converter circuit. In this embodiment, the phase switchgear cell 10 has a seventh and an eighth controllable bidirectional power semiconductor switch 17, 18 and a capacitor 19, with the capacitor 19 in the phase switchgear cell 10 being connected to the fifth and the sixth controllable bidirectional power switches 15, 16 in the phase switchgear cell 10. Furthermore, the seventh controllable bidirectional power semiconductor switch 17 in the phase switchgear cell 10 shown in FIG. 4 is connected to the connection point of the capacitor 19 in the phase switchgear cell 10 to the fifth controllable bidirectional power semiconductor switch 15 in the phase switchgear cell 10, and the eight controllable bidirectional power semiconductor switch 18 in the phase switchgear cell 10 is connected to the connection point of the capacitor 19 in the phase switchgear cell 10 to the sixth controllable bidirectional power semiconductor switch 16 in the phase switchgear cell 10, with the seventh and eighth controllable bidirectional power semiconductor switch 17, 18 in the phase switchgear cell 10 being connected to one another. The converter circuit as described above and as illustrated in FIG. 4 allows up to eleven switching voltage levels with a very small number of components.

Figure 5:
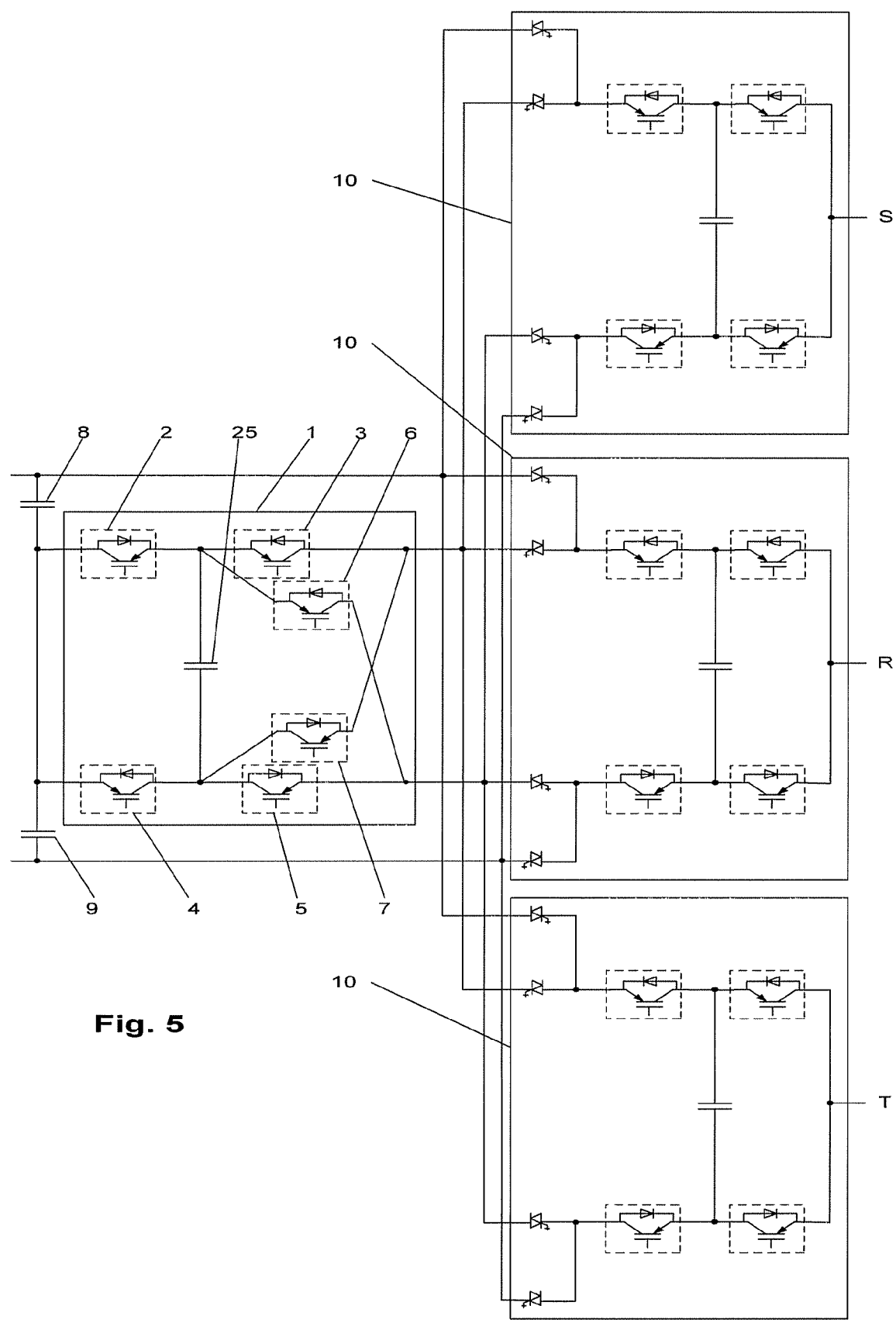
FIG. 5 shows a third embodiment of the converter circuit according to the disclosure.
Figure 6:
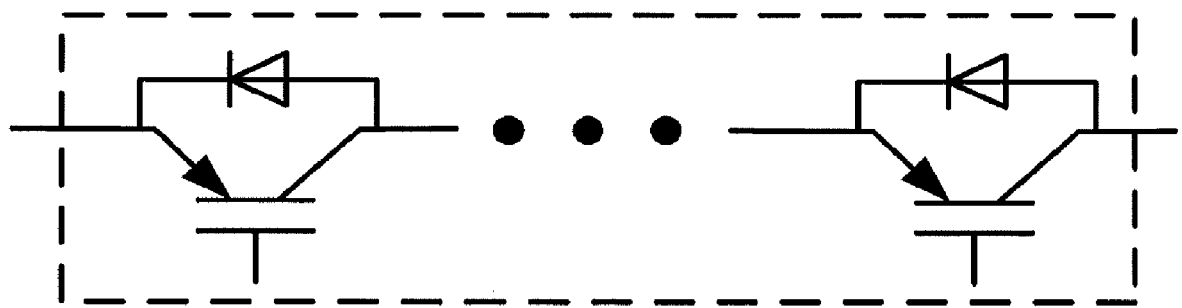
FIG. 6 shows an exemplary controllable bidirectional power semiconductor switch having at least two controllable bidirectional switching elements connected in series.

The respective controllable bidirectional power semiconductor switch 2, 3, 4, 5, 6, 7, 20, 21, 22, 23 in the switchgear cell 1 shown in FIG. 1 and FIG. 2 and the respective controllable bidirectional power semiconductor switch 15, 16, 17, 18 in the phase switchgear cell 10, as shown in FIG. 3, FIG. 4 and FIG. 5 can, for example, be formed by a bipolar transistor with a control electrode arranged in an insulated manner, (IGBT—Insulated Gate Bipolar Transistor) and by a diode connected back-to-back in parallel with it. Furthermore, the respective controllable bidirectional power semiconductor switch 11, 12, 13, 14 in the phase switchgear cell 10 shown in FIG. 3, FIG. 4 and FIG. 5 can, for example, be formed by an integrated thyristor with a commutated control electrode (IGCT) and by a diode connected back-to-back in parallel with it, in particular in order to allow an increased voltage to be switched. However, as an alternative, it is also feasible for the respective controllable bidirectional power semiconductor switch 11, 12, 13, 14 in the phase switchgear cell 10 to likewise be formed by a bipolar transistor with a control electrode arranged in an insulated manner (IGBT—Insulated Gate Bipolar Transistor) and by a diode connected back-to-back in parallel with it. In general, the first, second, third, and fourth controllable bidirectional power semiconductor switches 11, 12, 13, 14 in the phase switchgear cell 10 can, for example, each have at least two controllable bidirectional switching elements, with the controllable bidirectional switching elements being connected in series. This makes it possible to increase the voltage to be switched on the respective controllable bidirectional power semiconductor switch 11, 12, 13, 14 in the phase switchgear cell 10.

As already mentioned above, the respective switching element may be formed by a bipolar transistor with a control electrode arranged in an insulated manner (IGBT—Insulated Gate Bipolar Transistor) and by a diode connected back-to-back in parallel with it, or by an integrated thyristor with a commutated control electrode (IGCT) and by a diode connected back to back in parallel with it.

In a further development of the converter circuit shown in FIG. 4, FIG. 5 shows a third exemplary embodiment of the converter circuit. The converter circuit shown in FIG. 5 is suitable for connection to a plurality of phases R, Y, B, with the converter circuit shown in FIG. 5 being illustrated just by way of example only for connection to three phases R, Y, B, although in general any desired number of phases may be connected. In general, for this purpose, a phase switchgear cell 10 is provided for each phase R, Y, B, as is illustrated by way of example in FIG. 5. Furthermore, the first controllable bidirectional power semiconductor switch 11 in each phase switchgear cell 10 is connected to the first capacitive energy store 8 in the switchgear cell 1, with the second controllable bidirectional power semiconductor switch 12 in each phase switchgear cell 10 being connected to the connection point of the sixth controllable bidirectional power semiconductor switch 7 to the second controllable bidirectional power semiconductor switch 3 in the switchgear cell 1. The fourth controllable bidirectional power semiconductor switch 14 in each phase switchgear cell 10 is also connected to the second capacitive energy store 9 in the switchgear cell 1, with the third controllable bidirectional power semiconductor switch 13 in each phase switchgear cell 10 being connected to the connection point of the fifth controllable bidirectional power semiconductor switch 6 to the fourth controllable bidirectional power semiconductor switch 5 in the switchgear cell 1.

In a further development of the converter circuit which is not illustrated but is described in detail above, it is feasible to first of all once again provide a phase switchgear cell 10 for each phase R, Y, B for connection to a plurality, that is to say in general to any desired number of phases R, Y, B. In contrast to the embodiment of the converter circuit shown in FIG. 5, the first controllable bidirectional power semiconductor switch 11 in each phase switchgear cell 10 is then connected to the first capacitive energy store 8 in the switchgear cell 1, with the second controllable bidirectional power semiconductor switch 12 in each phase switchgear cell 10 being connected to the connection point of the fourth controllable bidirectional power semiconductor switch 23 to the first controllable bidirectional power semiconductor switch 20 in the n-th further switchgear cell 1.n. Furthermore, the fourth controllable bidirectional power semiconductor switch 14 in each phase switchgear cell 10 is connected to the second capacitive energy store 9 in the switchgear cell 1, with the third controllable bidirectional power semiconductor switch 13 in each phase switchgear cell 10 being connected to the connection point of the third controllable bidirectional power semiconductor switch 22 to the second controllable bidirectional power semiconductor switch 21 in the n-th further switchgear cell 1.n.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Group of connection
1.1, . . . 1.n n further groups of connection
2 First controllable bidirectional power semiconductor switch in the group of connection
3 Second controllable bidirectional power semiconductor switch in the group of connection
4 Third controllable bidirectional power semiconductor switch in the group of connection
5 Fourth controllable bidirectional power semiconductor switch in the group of connection
6 Fifth controllable bidirectional power semiconductor switch in the group of connection
7 Sixth controllable bidirectional power semiconductor switch in the group of connection
8 First capacitive energy store
9 Second capacitive energy store
10 Phase switchgear cell
11 First controllable bidirectional power semiconductor switch in the phase switchgear cell
12 Second controllable bidirectional power semiconductor switch in the phase switchgear cell
13 Third controllable bidirectional power semiconductor switch in the phase switchgear cell
14 Fourth controllable bidirectional power semiconductor switch in the phase switchgear cell
15 Fifth controllable bidirectional power semiconductor switch in the phase switchgear cell
16 Sixth controllable bidirectional power semiconductor switch in the phase switchgear cell
17 Seventh controllable bidirectional power semiconductor switch in the phase switchgear cell
18 Eighth controllable bidirectional power semiconductor switch in the phase switchgear cell
19 Capacitor in the phase switchgear cell
20 First controllable bidirectional power semiconductor switch in the n further group of connection
21 Second controllable bidirectional power semiconductor switch in the n further group of connection
22 Third controllable bidirectional power semiconductor switch in the n further group of connection
23 Fourth controllable bidirectional power semiconductor switch in the n further group of connection
24 Capacitor in the n further group of connection
25 Capacitor in the group of connection

What is claimed is:
1. A switchgear cell comprising:
a group of connections, with the group of connections having a first and a second controllable bidirectional power semiconductor switch and a capacitor,
wherein the group of connections has a third, fourth, fifth and sixth controllable bidirectional power semiconductor switch and the first controllable bidirectional power semiconductor switch is connected back-to-back in series with the second controllable bidirectional power semiconductor switch, the third controllable bidirectional power semiconductor switch is connected back-to-back in series with the fourth controllable bidirectional power switch, the capacitor is connected to the connection point of the first controllable bidirectional power semiconductor switch to the second controllable bidirectional power semiconductor switch and to the connection point of the third controllable bidirectional power semiconductor switch to the fourth controllable bidirectional power semiconductor switch, the fifth controllable bidirectional power semiconductor switch is connected to the connection point of the first controllable bidirectional power semiconductor switch to the second controllable bidirectional power semiconductor switch, and to the fourth controllable bidirectional power semiconductor switch, and the sixth controllable bidirectional power semiconductor switch is connected to the connection point of the third controllable bidirectional power semiconductor switch to the fourth controllable bidirectional power semiconductor switch and to the second controllable bidirectional power semiconductor switch, wherein a first capacitive energy store and a second capacitive energy store, which is connected in series with the first capacitive energy store are provided, and wherein the first controllable bidirectional power semiconductor switch and the third controllable bidirectional power semiconductor switch are connected to one another at the connection point of the first capacitive energy store to the second capacitive energy store.

2. The switchgear cell as claimed in claim 1, wherein further groups of connections are provided and each have a first, second, third, and fourth controllable bidirectional power semiconductor switch and a capacitor where n≧2, and the capacitor in each of the n further groups of connections is connected to the first controllable bidirectional power semiconductor switch and to the second controllable bidirectional power semiconductor switch, the third controllable bidirectional power semiconductor switch is connected to the connection point of the capacitor, to the first controllable bidirectional power semiconductor switch and to the second controllable bidirectional power semiconductor switch, and the fourth controllable bidirectional power semiconductor switch is connected to the connection point of the capacitor, to the second controllable bidirectional power semiconductor switch and to the first controllable bidirectional power semiconductor switch, wherein each of the n further groups of connections is connected in a linked form to the respectively adjacent further group of connections, and wherein the group of connections is connected to the first further group of connections.

3. The switchgear cell as claimed in claim 2, wherein the connection point of the sixth controllable bidirectional power semiconductor switch to the second controllable bidirectional power semiconductor switch in the group of connections is connected to the connection point of the capacitor to the first controllable bidirectional power semiconductor switch in the first further group of connections, and wherein the connection point of the fifth controllable bidirectional power semiconductor switch to the fourth controllable bidirectional power semiconductor switch in the group of connections is connected to the connection point of the capacitor to the second controllable bidirectional power semiconductor switch in the first further group of connections.

4. The switchgear cell as claimed in claim 3, wherein the first, second, third, fourth, fifth and sixth controllable bidirectional power semiconductor switches in the group of connections each have at least two controllable bidirectional switching elements, with the controllable bidirectional switching elements being connected in series.

5. The switchgear cell as claimed in claim 3, wherein the first, second, third and fourth controllable bidirectional power semiconductor switches in each of the n further groups of connections each have at least two controllable bidirectional switching elements, with the controllable bidirectional switching elements being connected in series.

6. A converter circuit for switching a multiplicity of voltage levels, wherein a switchgear cell as claimed in claim 2 and a phase switchgear cell are provided, with the phase switchgear cell having a first, second, third, fourth, fifth, and sixth controllable bidirectional power semiconductor switch and with the first controllable bidirectional power semiconductor switch of the phase switchgear cell being connected in series with the second controllable bidirectional power semiconductor switch in the phase switchgear cell, with the third controllable bidirectional power semiconductor switch in the phase switchgear cell being connected in series with the fourth controllable bidirectional power semiconductor switch in the phase switchgear cell, with the fifth controllable bidirectional power semiconductor switch in the phase switchgear cell being connected to the connection point of the first to the second controllable bidirectional power semiconductor switch in the phase switchgear cell, and with the sixth controllable bidirectional power semiconductor switch in the phase switchgear cell being connected to the connection point of the third to the fourth controllable bidirectional power semiconductor switch in the phase switchgear cell, wherein the first controllable bidirectional power semiconductor switch in the phase switchgear cell is connected to the first capacitive energy store in the switchgear cell, wherein the second controllable bidirectional power semiconductor switch in the phase switchgear cell is connected to the connection point of the fourth controllable bidirectional power semiconductor switch to the first controllable bidirectional power semiconductor switch in the n-th further group of connections, wherein the fourth controllable bidirectional power semiconductor switch in the phase switchgear cell is connected to the second capacitive energy store in the switchgear cell, and wherein the third controllable bidirectional power semiconductor switch in the phase switchgear cell is connected to the connection point of the third controllable bidirectional power semiconductor switch to the second controllable bidirectional power semiconductor switch in the n-th further group of connections.

7. The converter circuit as claimed in claim 6, wherein a phase switchgear cell is provided for each of a plurality of phases, wherein the first controllable bidirectional power semiconductor switch in each phase switchgear cell is connected to the first capacitive energy store in the switchgear cell, wherein the second controllable bidirectional power semiconductor switch in each phase switchgear cell is connected to the connection point of the fourth controllable bidirectional power semiconductor switch to the first controllable bidirectional power semiconductor switch in the n-th further switchgear cell, wherein the fourth controllable bidirectional power semiconductor switch in each phase switchgear cell is connected to the second capacitive energy store in the switchgear cell, and wherein the third controllable bidirectional power semiconductor switch in each phase switchgear cell is connected to the connection point of the third controllable bidirectional power semiconductor switch to the second controllable bidirectional power semiconductor switch in the n-th further switchgear cell.

8. The converter circuit as claimed in claim 7, wherein the first, second, third and fourth controllable bidirectional power semiconductor switches in the phase switchgear cell each have at least two controllable bidirectional switching elements, with the controllable bidirectional switching elements being connected in series.

9. The converter circuit as claimed in claim 6, wherein the fifth and sixth controllable bidirectional power semiconductor switches in the phase switchgear cell are connected to one another.

10. The converter circuit as claimed in claim 6, wherein the phase switchgear cell has a seventh and an eighth controllable bidirectional power semiconductor switch and a capacitor, and wherein the capacitor in the phase switchgear cell is connected to the fifth and sixth controllable bidirectional power semiconductor switches in the phase switchgear cell.

11. The switchgear cell as claimed in claim 1, wherein the first, second, third, fourth, fifth and sixth controllable bidirectional power semiconductor switches in the group of connections each have at least two controllable bidirectional switching elements, with the controllable bidirectional switching elements being connected in series.

12. The switchgear cell as claimed in claim 1, wherein the first, second, third and fourth controllable bidirectional power semiconductor switches in each of the n further groups of connections each have at least two controllable bidirectional switching elements, with the controllable bidirectional switching elements being connected in series.

13. A converter circuit for switching a multiplicity of voltage levels, wherein a switchgear cell as claimed in claim 1 and a phase switchgear cell are provided, with the phase switchgear cell having a first, second, third, fourth, fifth, and sixth controllable bidirectional power semiconductor switch and with the first controllable bidirectional power semiconductor switch of the phase switchgear cell being connected in series with the second controllable bidirectional power semiconductor switch in the phase switchgear cell, with the third controllable bidirectional power semiconductor switch in the phase switchgear cell being connected in series with the fourth controllable bidirectional power semiconductor switch in the phase switchgear c, with the fifth controllable bidirectional power semiconductor switch in the phase switchgear cell being connected to the connection point of the first controllable bidirectional power semiconductor switch to the second controllable bidirectional power semiconductor switch in the phase switchgear cell, and with the sixth controllable bidirectional power semiconductor switch in the phase switchgear cell being connected to the connection point of the third controllable bidirectional power semiconductor switch to the fourth controllable bidirectional power semiconductor switch in the phase switchgear cell, wherein the first controllable bidirectional power semiconductor switch in the phase switchgear cell is connected to the first capacitive energy store in the switchgear cell, wherein the second controllable bidirectional power semiconductor switch in the phase switchgear cell is connected to the connection point of the sixth controllable bidirectional power semiconductor switch to the second controllable bidirectional power semiconductor switch in the switchgear cell, in that the fourth controllable bidirectional power semiconductor switch in the phase switchgear cell is connected to the second capacitive energy store in the switchgear cell, and wherein the third controllable bidirectional power semiconductor switch in the phase switchgear cell is connected to the connection point of the fifth controllable bidirectional power semiconductor switch to the fourth controllable bidirectional power semiconductor switch in the switchgear cell.

14. The converter circuit as claimed in claim 3, wherein the fifth and sixth controllable bidirectional power semiconductor switches in the phase switchgear cell are connected to one another.

15. The converter circuit as claimed in claim 13, wherein the phase switchgear cell has a seventh and an eighth controllable bidirectional power semiconductor switch and a capacitor, wherein the capacitor in the phase switchgear cell is connected to the fifth and sixth controllable bidirectional power semiconductor switches in the phase switchgear cell, wherein the seventh controllable bidirectional power semiconductor switch in the phase switchgear cell is connected to the connection point of the capacitor in the phase switchgear cell to the fifth controllable bidirectional power semiconductor switch in the phase switchgear cell, and the eighth controllable bidirectional power semiconductor switch in the phase switchgear cell is connected to the connection point of the capacitor in the phase switchgear cell to the sixth controllable bidirectional power semiconductor switch in the phase switchgear cell, and wherein the seventh and eighth controllable bidirectional power semiconductor switches in the phase switchgear cell are connected to one another.

16. The converter circuit as claimed in claim 13, wherein a phase switchgear cell is provided for each of a plurality of phases, wherein the first controllable bidirectional power semiconductor switch in each phase switchgear cell is connected to the first capacitive energy store in the switchgear cell, and wherein the second controllable bidirectional power semiconductor switch in each phase switchgear cell is connected to the connection point of the sixth controllable bidirectional power semiconductor switch to the second controllable bidirectional power semiconductor switch in the switchgear cell, wherein the fourth controllable bidirectional power semiconductor switch in each phase switchgear cell is connected to the second capacitive energy store in the switchgear cell, and wherein the third controllable bidirectional power semiconductor switch in each phase switchgear cell is connected to the connection point of the fifth controllable bidirectional power semiconductor switch to the fourth controllable bidirectional power semiconductor switch in the switchgear cell.

17. The converter circuit as claimed in claim 13, wherein the first, second, third and fourth controllable bidirectional power semiconductor switches in the phase switchgear cell each have at least two controllable bidirectional switching elements, with the controllable bidirectional switching elements being connected in series.

18. A converter circuit for switching voltage levels, comprising:
- a switchgear cell having a group of connections, with the group of connections having a first and a second controllable bidirectional power semiconductor switch and a capacitor; and
- a phase switchgear cell, the phase switchgear cell having a first, second, third, fourth, fifth, and sixth controllable bidirectional power semiconductor switch and with the first controllable bidirectional power semiconductor switch of the phase switchgear cell being connected in series with the second controllable bidirectional power semiconductor switch in the phase switchgear cell, with the third controllable bidirectional power semiconductor switch in the phase switchgear cell being connected in series with the fourth controllable bidirectional power semiconductor switch in the phase switchgear cell, with the fifth controllable bidirectional power semiconductor switch in the phase switchgear cell being connected to the connection point of the first controllable bidirectional power semiconductor switch to the second controllable bidirectional power semiconductor switch in the phase switchgear cell, and with the sixth controllable bidirectional power semiconductor switch in the phase switchgear cell being connected to the connection point of the third controllable bidirectional power semiconductor switch to the fourth controllable bidirectional power semiconductor switch in the phase switchgear cell,
wherein the first controllable bidirectional power semiconductor switch in the phase switchgear cell is connected to a first capacitive energy store in the switchgear cell,
wherein the second controllable bidirectional power semiconductor switch in the phase switchgear cell is connected to a connection point of the sixth controllable bidirectional power semiconductor switch to the second controllable bidirectional power semiconductor switch in the switchgear cell,
wherein the fourth controllable bidirectional power semiconductor switch in the phase switchgear cell is connected to a second capacitive energy store in the switchgear cell, and
wherein the third controllable bidirectional power semiconductor switch in the phase switchgear cell is connected to a connection point of the fifth controllable bidirectional power semiconductor switch to the fourth controllable bidirectional power semiconductor switch in the switchgear cell.

* * * * *